United States Patent
Schmidt et al.

(10) Patent No.: US 6,372,315 B1
(45) Date of Patent: Apr. 16, 2002

(54) ALL-METAL BASE PLATE HAVING A PRONGED HUB FOR PRESS-IN ATTACHMENT OF A LOAD BEAM ASSEMBLY TO A HEAD ACTUATOR ARM OF A DISK DRIVE

(75) Inventors: Ryan Schmidt; Kevin Hanrahan; Steve Braunheim, all of Santa Barbara, CA (US)

(73) Assignee: Intri-Plex Technologies, Inc., Santa Barbara, CA (US)

(*) Notice: Subject to any disclaimer, the term of this patent is extended or adjusted under 35 U.S.C. 154(b) by 0 days.

(21) Appl. No.: 09/599,204

(22) Filed: Jun. 22, 2000

Related U.S. Application Data

(63) Continuation of application No. 09/003,871, filed on Jan. 7, 1998, now abandoned.

(51) Int. Cl.[7] .............. B29D 22/00; B32B 3/10; G11B 5/55; G11B 5/127; B21D 39/00
(52) U.S. Cl. .............. 428/34.1; 428/132; 428/133; 360/104; 360/106; 29/507; 29/522.1; 29/523; 29/603.03; 29/603.04
(58) Field of Search .............. 428/34.1, 132, 428/133; 29/507, 523, 522.1, 603.03, 603.04; 360/104, 106

(56) References Cited

U.S. PATENT DOCUMENTS

| 3,567,016 | A | * | 3/1971 | Bardell ..................... 206/65 |
| 5,172,286 | A | * | 12/1992 | Jurgenson ................. 360/104 |
| 5,185,683 | A | * | 2/1993 | Oberg et al. .............. 360/104 |
| 5,363,262 | A | * | 11/1994 | Drennan .................... 360/106 |
| 5,444,587 | A | * | 8/1995 | Johnson et al. ........... 360/104 |
| 5,717,545 | A | * | 2/1998 | Brooks, Jr. et al. ....... 360/104 |

* cited by examiner

Primary Examiner—Rena L. Dye
Assistant Examiner—Michael C. Miggins
(74) Attorney, Agent, or Firm—Owen L. Lamb

(57) ABSTRACT

A base plate for press fitting into a boss hole of a predetermined nominal diameter. The base plate has a flange and a hub extending from a region at which the hub meets the flange to an outer end of the hub. The hub has a number of vertical slots cut through the hub extending from the outer end of the hub part way or all the way to the region at which the hub meets the flange a space between slots determining boundaries of a prong. The hub has an outer diameter which is greater than the predetermined nominal diameter or alternatively the hub has an outer diameter at the region at which the hub meets the flange which is not greater than the predetermined nominal diameter, in which case each the prong extends outward to a prong outer diameter which is greater than the predetermined nominal diameter. Also the base plate may have a corner relief that circumscribes the region at which the hub meets the flange.

9 Claims, 2 Drawing Sheets

ALL-METAL BASE PLATE HAVING A PRONGED HUB FOR PRESS-IN ATTACHMENT OF A LOAD BEAM ASSEMBLY TO A HEAD ACTUATOR ARM OF A DISK DRIVE

CROSS-REFERENCE TO RELATED APPLICATION

This application is a continuation of application Ser. No. 09/003,871 filed Jan. 7, 1998, now abandoned, entitled, "Base Plate With Pronged Hub For Press-In Attachment Of Suspension Assembly to an Actuator Arm In Hard Disk Drive" and is related to copending application Ser. No. 09/003,872, now U.S. Pat. No. 6,141,868, filed Jan. 7, 1998 on behalf of Ryan Schmidt, et al. entitled "Method And Apparatus For Press-In Attachment Of Suspension Assembly In Hard Disk Drive", both of which applications are incorporated herein by reference.

BACKGROUND OF THE INVENTION

1. Field of the Invention

This invention relates to disk head assemblies for supporting read/write heads adjacent rotating disks in disk drives and more particularly, to a base plate for attaching a head suspension assembly to a head actuator arm.

2. Description of the Prior Art

In hard disk drives data are stored on magnetizable surfaces of a plurality of rotatable disks that are mounted in a coaxial stack on a housing of the drive. Transducer heads that write data to and read data from the disk surfaces are supported by an actuator that is mounted on the housing and can be actuated to position the transducer heads in alignment with concentric data tracks defined on the disks. Each transducer head is attached to one end of a head suspension that is connected to an actuator arm that extends from the actuator body. The suspensions include a flexible load beam constructed of light sheet steel that has a bend formed in it. The load beam acts as a spring that forces the head against the disk surface with an accurate pre-load or "gram Load". Air turbulence caused by the rotating disks lifts the heads slightly off of the disks so that the heads fly on an air bearing across the disk surfaces. The air bearing force is counteracted by the suspension gram load.

A head-carrying suspension is attached to an actuator arm using a base plate that forms a part of the head suspension. The base plate includes a flat flange portion and a cylindrical hub portion or boss. The base plate hub is passed through a load beam clearance hole and the flange is spot welded to the load beam. The combined base plate, load beam and a flexure make up a head suspension, and the suspension has the hub of the base plate extending through and beyond the load beam clearance hole.

The hubs of two suspensions are inserted into an actuator arm boss hole formed through an actuator arm extending from an actuator body, one hub entering an actuator arm boss hole from each end of the hole. In the prior art, a swage ball is in passed through the cylindrical hubs to force the peripheries of the hubs to expand (swage) into tight engagement with the inner peripheries of the actuator arm boss hole. Thus, an actuator arm may carry two suspensions on opposite sides thereof to support two transducer heads in opposing directions, one up and one down.

Problems with this method of mounting transducer heads have arisen as the need for increased data storage capacity in hard disk drives has grown and the size of the disk drive has decreased to fit in small lap top computers. The problem of forming a strong connection between the actuator arms and the transducer suspensions has been made more difficult as the thickness of the components has become smaller.

Because of the joining of two transducer suspensions to an actuator arm by passing a swage ball through two hubs in the same hole in the actuator arm, an asymmetry exists in the forces that are exerted on the hubs to make the joints. Because the transducer heads face in opposite directions, the hubs on their respective load beams also extend in opposite directions with respect to the direction of passage of the ball through the inner diameters of the hubs. For one transducer suspension, the ball is passed in a direction that tends to place the hub in compressive stress while, for the other transducer suspension, the direction of passage of the ball is such as to tend to place the hub in tensile stress. In order to achieve a permanent bond between the hub and the actuator, the passage of the ball must cause permanent, or plastic, deformation of the hub. This deformation often causes a change in shape of the flange portion of the base plate, which results in a change in the suspension gram load. The differences in shape changes and stresses between the suspensions swaged in tension and compression causes differences in gram load change and hub/actuator joint integrity between these up and down facing parts.

It is therefore an object of this invention to provide a base plate that eliminates the need for swaging and the resulting up and down facing head pre-load and joint integrity differences.

It is also an object of this invention is to provide a base plate that can be pressed into an a actuator arm to create a press fit.

SUMMARY OF THE INVENTION

Briefly, the invention is concerned with a base plate for press fitting into a boss hole of a predetermined nominal diameter. The base plate comprises a flange and a hub extending from a region at which the hub meets the flange to an outer end of the hub. The hub has a number of axial slots cut through the hub extending from the outer end of the hub part way to the region at which the hub meets the flange, adjacent pair of slots determining boundaries of a prong therebetween.

In accordance with an aspect of the invention, the hub has an outer diameter which is greater than the predetermined nominal diameter. Alternatively, the hub has an outer diameter at the region at which the hub meets the flange which is not greater than the predetermined nominal diameter, and each prong extends outward to a prong outer diameter which is greater than the predetermined nominal diameter. In either case, a corner relief may be provided that circumscribes the region at which the hub meets the flange.

The unique base plate geometry reduces tooling and press-in forces, provides a more consistent mating between suspension and actuator, and reduces retention torque sensitivity to actuator hole size variation.

The invention utilizes modified post processing that leaves the base plate with a much higher yield strength than conventionally processed swagable base plates. This increased strength further reduces gram load change caused by the attachment process, increases retention torque, reduces burr formation during press-in, and improves suspension handling damage resistance.

An advantage of this invention is that it allows the use of a base plate to connect a head suspension to an actuator arm without swaging.

The invention has the advantage that press-in base plates reduce the large stresses and deformations associated with swaging that result in gram load change.

The invention has the further advantage that press-in base plates eliminate the gram load change difference that occurs between up and down heads resulting from the different mechanics of conventional tension and compression swaging.

The invention has the further advantage that increased flange yield strength results, further reducing gram load change and handling damage sensitivity.

BRIEF DESCRIPTION OF THE DRAWINGS

The invention will be described in greater detail with reference to the drawings in which:

FIG. 1b is side elevation view of a base plate of FIG. 1a;

In these figures, similar numerals refer to similar elements in the drawing. It should be understood that the sizes of the different components in the figures may sit not be to scale, or in exact proportion, and are shown for visual clarity and for the purpose of explanation.

DETAILED DESCRIPTION OF THE INVENTION

Figure 1A:
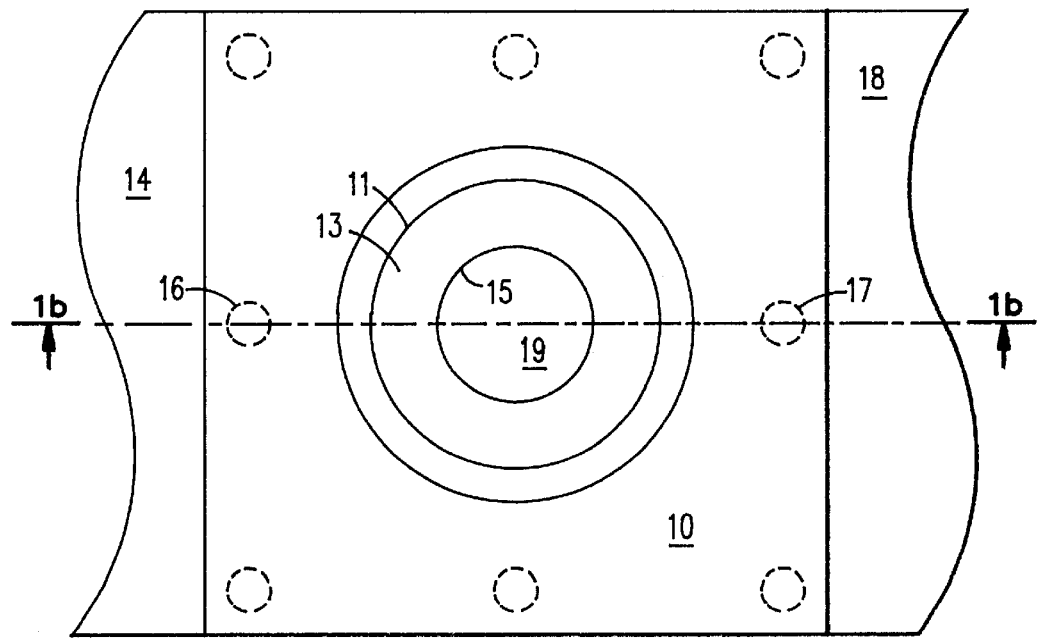
FIG. 1a is top view of a base plate of the prior art.
Figure 1B:
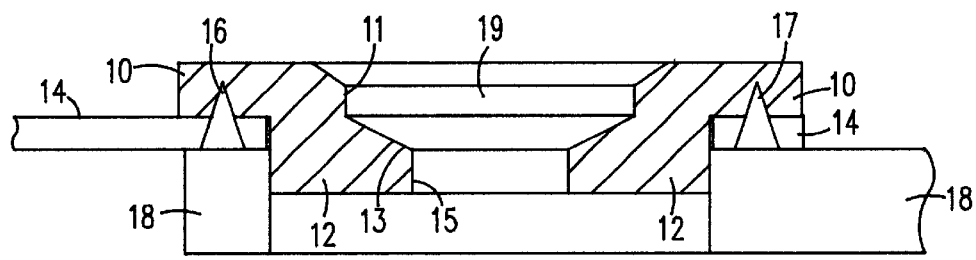

Refer to FIGS. 1a and 1b which illustrate a base plate of the prior art. An is actuator arm and head suspension, which are elements of an actuator arm assembly, are connected end to end by the base plate. The base plate includes a flat flange portion 10 and a cylindrical hub portion or boss 12. A base plate typically has an inner barrel shape with a counter bore 11, a lead-in chamfer 13 and an inner diameter 15. The counter bore and inner diameter are perpendicular to the plane of the base plate flange 10. In assembling the suspension, the hub 12 is inserted through a load beam boss hole in a load beam 14 which is part of the suspension and the flange portion 10 is welded 16, 17, to the load beam. The hub is then inserted through an actuator arm boss hole in the actuator arm 18. A swage ball tool is passed through the center inner barrel 19 of the hub 12 causing pressure to be applied to cause the hub 12 to expand into the boss hole in the actuator arm, rigidly connecting the hub and attached load beam to the actuator arm boss hole.

A stack of head suspensions are assembled to actuator arms by swaging. Transducer heads are attached to the ends of suspensions. Each suspension is connected to an actuator arm 18 that extends from an actuator body. Each suspension includes a flexible load beam 14 constructed of light sheet steel that will flex sufficiently to permit air turbulence caused by rotating disks, to lift the heads slightly off of the disks so that the heads fly across the disk surfaces on an air bearing. A base plate hub 12 of a base plate 10 is passed through a load beam clearance hole and the flange is spot welded 16, 17, etc. to the load beam. The combined base plate and load beam is called a head suspension, and each head it suspension has the hub of a base plate extending through and beyond the load beam clearance hole. The cylindrical hubs of the two suspensions are inserted into is an actuator arm boss hole formed through the actuator arm, one hub entering the actuator arm boss hole from each end of the hole.

A swage ball is passed through the barrels of all of the cylindrical hubs, loading opposing hubs in tension and compression, to force the peripheries of the fig hubs to expand (swage) into tight engagement with the inner peripheries of the fig corresponding actuator arm boss holes. For example, one actuator arm may carry two suspensions, on opposite sides thereof to support two transducer heads, in opposing directions in close proximity with the surfaces of the two disks in the assembled hard disk drive.

Because of the joining of two transducer suspensions to an actuator arm by passing a swage ball through two hubs in the same hole in the actuator arm, an asymmetry exists in the forces that are exerted on the hubs to make the joints. Because the transducer heads face in opposite directions, the hubs on their respective load beams also extend in opposite directions with respect to the direction of passage of the ball through the inner diameters of the hubs. For one transducer suspension, the ball is passed in a direction that tends to place the hub in compressive stress while, for the other transducer suspension, the direction of passage of the ball is such as to tend to place the hub in tensile stress. In order to achieve a permanent bond between the hub and the actuator, the passage of the ball must cause permanent, or plastic, deformation of the hub. This deformation often causes a change in shape of the flange portion of the base plate, which results in a change in the suspension gram load. The differences in shape changes and stresses between the suspensions swaged in tension and compression causes differences in gram load change and hub/actuator joint integrity between these up and down facing parts.

Base plates constructed in accordance with the teachings of the present invention solve this problem by eliminating the need for swaging. The base plates are press fitted into the actuator arm boss holes. A method and apparatus for doing this during manufacture is described in the above identified copending application Ser. No. 09/003,872, now U.S. Pat. No. 6,141,868.

Figure 2:
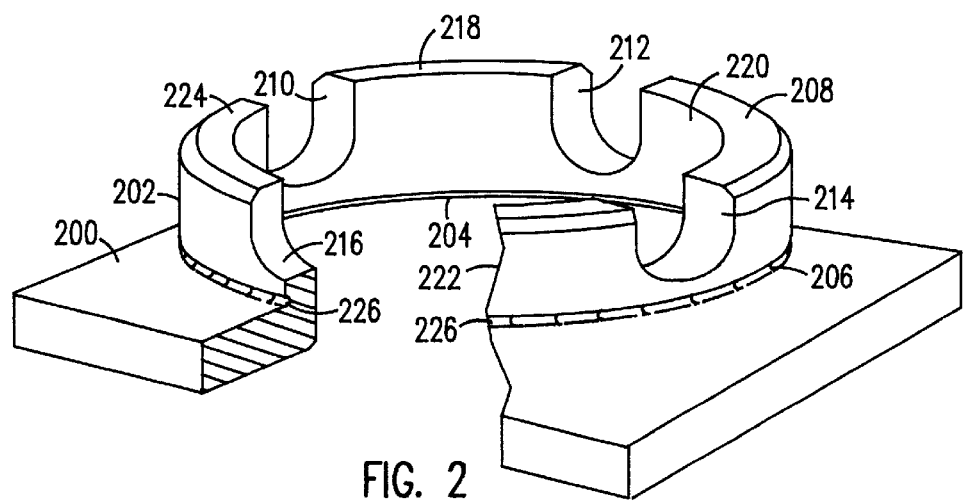
FIG. 2 is a perspective view of the base plate of the present invention.

Refer to FIG. 2 which illustrates a base plate of the present invention. The base plate includes a flat flange portion 200 and a cylindrical hub portion or boss 202. The hub has an inner barrel with an inner diameter 204. The inner diameter is perpendicular to the plane of the base plate flange 200. The hub extends from a region 206 at which the hub meets the flange to an outer end 208 of the hub. The hub has a number of axial slots 210, 212, 214, 216 cut through the hub extending from the outer end 208 of the hub part way to the region 206 at which the hub meets the flange 200. Adjacent pairs of slots determine boundaries of prongs 218, 220, 222, 224.

In one embodiment, the hub has an outer diameter which is greater than a predetermined nominal diameter of an actuator arm boss hole. A corner relief 226 may be provided that circumscribes the region 206 at which the hub meets the flange. This relief helps reduce transmission of bending from the hub to the flange which would cause gram load change.

In another embodiment, the hub has an outer diameter at the region at which the hub meets the flange which is not greater than the predetermined nominal diameter, and each prong extends outward to a prong outer diameter which is greater than the predetermined nominal diameter.

Figure 3A:
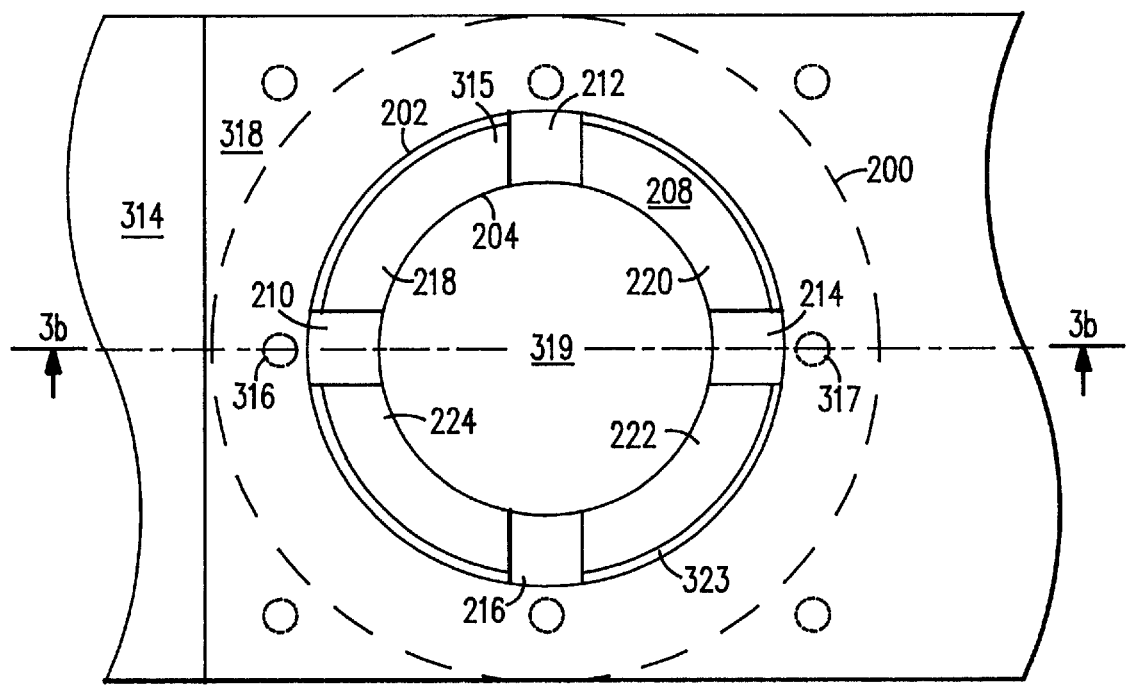
FIG. 3a is bottom view of a base plate of FIG. 2.
Figure 3B:
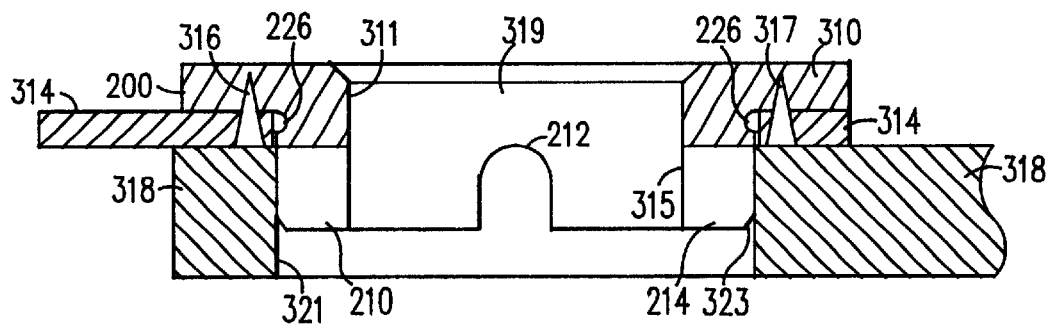
FIG. 3b is side elevation view of a base plate of FIG. 3a welded to a load beam and attached to an actuator arm.

Refer to FIGS. 3a and 3b which illustrate the base plate of FIG. 2. An actuator arm and head suspension, which are elements of an actuator arm assembly, are connected end to end by the base plate. The base plate includes a flat flange portion 200 and a cylindrical hub portion or boss 202. The hub has an inner barrel 319 with an inner diameter 204. The inner diameter is perpendicular to the plane of the base plate flange 200. Four or more slots 210, 212, 214, 216 are cut through the hub such that the axial slots each have a height which is less than the height of the hub.

In assembling the suspension assembly, the hub 202 is inserted through a load beam clearance hole in a load beam 314. The flange portion 200 is welded 316, 317, etc. to the load beam. To create the actuator arm assembly, the hub is force fitted in an actuator arm boss hole 321 in the actuator arm 318. Pressure is applied to force the hub 202 into the boss hole in the actuator arm, rigidly connecting the hub and attached load beam to the actuator arm boss hole. The hub outer diameter where the hub meets the flange is the same or slightly smaller than the nominal diameter of the boss hole 321 in the actuator arm 318. The prongs are formed during manufacture of the base plate so that the prongs extend beyond the outer diameter. To aid the hub in aligning and entering the actuator boss hole 321, a hub outer diameter lead-in chamfer 323 is provided.

While the invention has been particularly shown and described with reference to preferred embodiments thereof, it will be understood by those skilled in the art that the foregoing and other changes in form and detail may be made therein without departing from the scope of the invention.

What is claimed is:

1. A base plate comprising:

a metal flange, and, a metal hub contiguous with said flange, said hub extending perpendicular to said flange and having a height which extends from a region at which said hub meets said flange to an outer end of said hub;

a plurality of axial slots cut through said hub;

a plurality of prongs equal to said plurality of axial slots;

said prongs each being bounded by an adjacent pair of said axial slots;

said axial slots extending from said outer end of said hub to a point that is located between said outer end of said hub and said region at which said hub meets said flange such that said axial slots each have a height which is less than said height of said hub.

2. The base plate according to claim 1 wherein said base plate is arranged to be press fitted into a boss hole of a predetermined nominal diameter such that said hub has an outer diameter which is greater than said predetermined nominal diameter.

3. The base plate according to claim 1 wherein said base plate is arranged to be press fitted into a boss hole of a predetermined nominal diameter such that said hub has an outer diameter at said region at which said hub meets said flange which is not greater than said predetermined nominal diameter, and each of said prongs extends outward to a prong outer diameter which is greater than said predetermined nominal diameter.

4. A base plate for press fitting into a boss hole of a predetermined nominal diameter comprising:

a metal flange; and, a metal hub contiguous with said flange, said hub being perpendicular to said flange and having a height which extends from a region at which said hub meets said flange to an outer end of said hub;

an outer diameter of said hub being greater than said nominal diameter;

said hub having a plurality of axial slots cut through said hub;

each said plurality of axial slots cut through said hub extending from said outer end of said hub to a point that is located between said outer end of said hub and said region at which said hub meets said flange such that said axial slots each have a height which is less than said height of said hub;

a plurality of prongs equal to said plurality of axial slots;

said prongs each being bounded by an adjacent pair of said axial slots.

5. The base plate according to claim 4 wherein:

said hub has an outer diameter at said region at which said hub meets said flange which is not greater than said predetermined nominal diameter, and each of said prongs extends outward to a prong outer diameter which is greater than said predetermined nominal diameter.

6. In a disk drive in which an actuator arm having an actuator arm boss hole in said actuator arm and a load beam having a load beam clearance hole in said load beam, are connected together, a combination comprising:

a flat metal flange; and, a cylindrical metal hub contiguous with said flange;

said hub having an inner barrel;

said hub being perpendicular to said flange;

a plurality of axial slots cut completely through said hub into said inner barrel;

said hub being inserted through said load beam clearance hole in said load beam;

said flange being welded to said load beam;

said hub being force fitted in said actuator arm boss hole in said actuator arm, such that said hub and load beam are connected to said actuator arm.

7. The combination according to claim 6 wherein:

said actuator arm boss hole has a predetermined nominal diameter; and, said hub has an outer diameter at a region at which said hub meets said flange which is not greater than said predetermined nominal diameter, and each of said prongs extends outward to a prong outer diameter which is greater than said predetermined nominal diameter.

8. The combination according to claim 7 wherein said hub has an outer diameter lead-in chamfer.

9. The combination according to claim 6 wherein said hub has an outer diameter lead-in chamfer.

* * * * *